INVENTOR
MELVIN P. XYLANDER
BY Leo J. Aubel
ATTORNEY

Feb. 22, 1966 M. P. XYLANDER 3,237,167

SHIFT REGISTER UTILIZING MAGNETIC CORES AND TRANSISTOR LATCH CIRCUITS

Filed Aug. 8, 1960 2 Sheets-Sheet 2

United States Patent Office 3,237,167
Patented Feb. 22, 1966

3,237,167

SHIFT REGISTER UTILIZING MAGNETIC CORES AND TRANSISTOR LATCH CIRCUITS

Melvin P. Xylander, Apalachin, N.Y., assignor to International Business Machines Corporation, New York, N.Y., a corporation of New York Filed Aug. 8, 1960, Ser. No. 48,078
10 Claims. (Cl. 340—172.5)

Figure 1A:
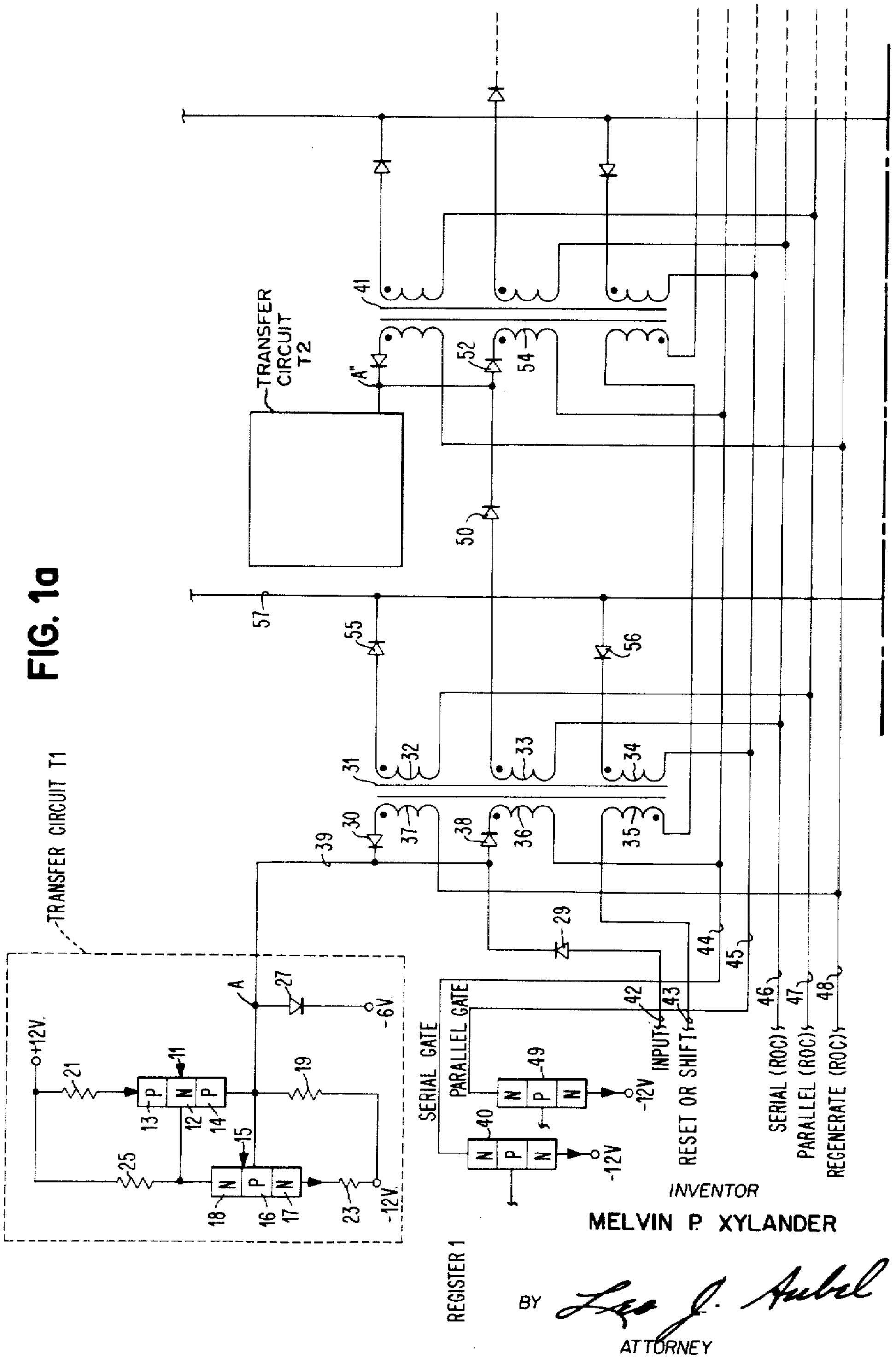

This invention relates to a data processing apparatus and more particularly to a binary data transfer circuit.

Transfer or latch circuits are generally useful in a number of applications, for example, in magnetic core shift registers. Magnetic core shift registers are, at times, difficult to accommodate in data processing machines, particularly where a large number of such registers are employed and where data transfer must be selectively effected between various ones of the registers and/or various other parts of the data processing machine. It has been found desirable to utilize secondary storage elements in conjunction with the storage registers. Capacitors which have generally been used as the secondary storage elements, by their very character, can only temporarily store the output of one stage of a shift register for subsequent entry into a succeeding stage of the register. Further, in order to utilize the data or information stored in a capacitor, power from a preceding core initially charges the capacitor to a given value. Because power is required from the cores to charge the capacitor, the cores must be relatively large. When large cores are used, the speed of operation of the shift register is undesirably reduced since, as is known, the speed at which the core shifts from one to its other stable state depends on the diameter of the core.

Accordingly, it is a principal object of the present invention to provide improved transistor transfer or latch circuits.

It is another object of the present invention to provide a secondary storage element for magnetic shift registers, which element is capable of permanently storing data coupled thereto.

It is another object of the present invention to provide a secondary storage element capable of retaining data permanently and which can be selectively coupled to any one of a plurality of shift register stages or to other information-receiving devices.

Another object of this invention is to provide a plurality of magnetic core shift registers utilizing relatively small cores for obtaining high speed operation.

A further object of this invention is to provide improved means for effecting transfer of data among various magnetic core shift registers.

According to a preferred embodiment of the present invention, a transfer or latch circuit includes a stage comprising a pair of transistors arranged to be operated from a first to a second condition when a signal is supplied thereto and which circuit remains in its second condition until a second signal causes the transistors to shift back to a first condition. A plurality of such transfer circuits are utilized as secondary storage elements for a plurality of magnetic core shift registers which registers are positioned to form rows and columns. A transfer circuit is coupled to each of the cores in a row, and each latch circuit is arranged to receive data from, and provide data to, its associated core. A transfer circuit is also coupled in common, that is, in parallel to each one of the columns of cores to selectively receive data from and provide data to the registers in a column.

A bit of information stored in a selected stage of a particular magnetic core shift register is fed to the associated transfer circuit by reversing the magnetic state of the core and switching the signal thus developed to the said transfer circuit. The transfer circuit stores the signal or data "bit" until some other core or signal-receiving device is selected to receive the signal.

Each of the registers in a row includes switching means whereby any register may be switched to receive an output from the preceding register; also, each of the shift registers in a column include switching means whereby any register in a column may be switched to receive an output from any other register in the column.

By thus providing means for transferring information among several magnetic core shift registers, a data processing machine may be given added flexibility since the information in one register may be shifted and/or dumped out in series or parallel to other registers. Also, by providing a common line to the registers in each column and by utilizing a single secondary storage device, namely the transfer or latch circuit, as a transfer element, a reduction in structure is achieved without compromising flexibility.

The foregoing and other objects, features and advantages of the invention will be apparent from the following more particular description of a preferred embodiment of the invention, as illustrated in the accompanying drawings.

Figure 1B:
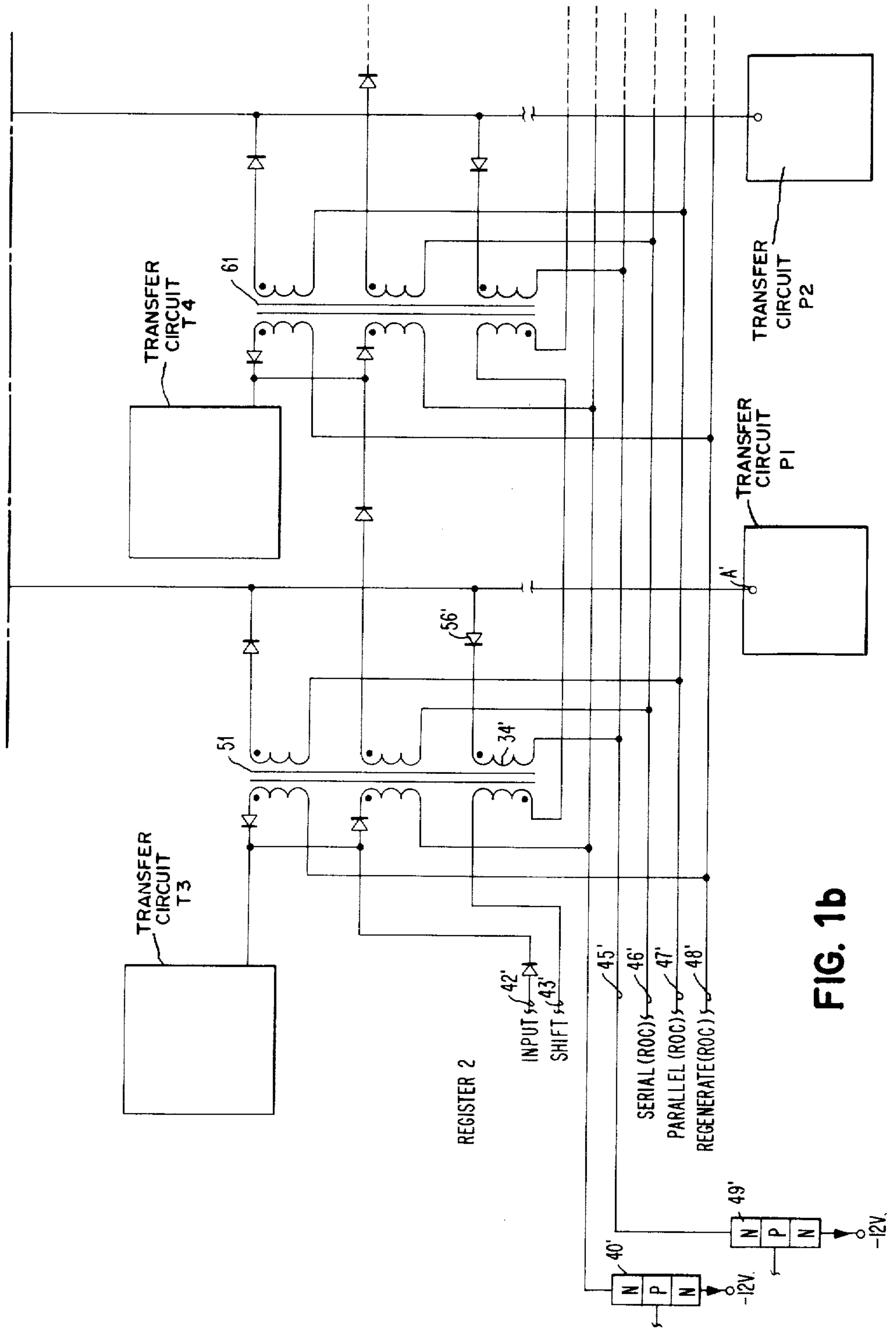

In the drawings:

FIGS. 1*a* and 1*b* show a schematic diagram of a transfer circuit and two single-core per stage magnetic core shift registers connected in accordance with the present invention.

Referring to FIG. 1*a*, the transfer or latch circuit T1 comprises a PNP type junction transistor 11 having a base 12, an emitter 13 and a collector 14; and, an NPN type junction transistor 15 having a base 16, emitter 17 and a collector 18. The collector 14 of the PNP transistor 11 is connected to the base 16 of NPN transistor 15 and through a resistor 19 to a negative potential, in one case, a potential of minus 12 volts. The emitter 13 of transistor 11 is connected through a resistor 21 to a positive potential, in the one case, a potential of plus 12 volts. The emitter 17 of transistor 15 is connected through a resistor 23 to the negative potential, and the collector 18 of transistor 15 is connected to the base 12 of transistor 11 and through a resistor 25 to the positive potential. A diode 27 has its anode connected to the junction of collector 14 of transistor 11, base 16 and resistor 19, and has its cathode connected to a negative potential, in this case, a potential of minus 6 volts. The foregoing common junction of collector 14, base 16, resistor 19 and diode 27 is designated as point A for purposes of description.

In one embodiment, resistor 19 has a value of 750 ohms, resistor 21 a value of 430 ohms, resistor 23 a value of 510 ohms, and resistor 25 a value of 1000 ohms.

Transistors 11 and 15 are both biased to be normally nonconducting, that is, to be in one stable state. A positive signal applied to point A, and thus to base 16 of transistor 15, causes transistor 15 to conduct. When transistor 15 conducts, its collector 18 becomes relatively more negative and couples a more negative potential to the base 12 of transistor 11, causing transistor 11 to become conductive. When transistor 11 conducts, collector 14 becomes more positive; this positive potential feeds back to the base 16 of transistor 15 and maintains transistor 15 in a conducting condition thus "latching" the circuit to a second stable conducting condition or state.

Transistor 11 is a constant current device as long as it remains out of saturation and in a preferred embodiment, it is arranged to have approximately 50 milliamperes of current flowing therethrough. With approximately 10 milliamperes of current flowing through resistor 19, the potential developed across diode 27 is sufficient to cause diode 27 to conduct so that of the fifty (50) milliamperes of current flowing through transistor 11, ten (10) milliamperes flow through resistor 19 and the remaining forty (40) milliamperes of current flow through diode 27.

Transistors 11 and 15 will remain conducting in the foregoing condition until point A becomes negative. When point A becomes negative, the feedback path from transistor 11 to transistor 15 is disabled and the transfer circuit becomes nonconductive, that is, changes conducting states. In effect, a negative potential at point A shunts resistor 19 to disable the feedback path.

The input and output connections to transfer circuit T1 are both at the same point A so that a common input-output lead can be connected to the transfer circuit.

It will be appreciated that diode 27 converts point A from a constant current point to a constant voltage point as long as the diode is conducting; this assures the stability of the transfer circuit T1 up to the time just prior to cut-off. Also, since diode 27 is a non-linear device, it tends to keep transistor 11 from saturating, thus, tending to increase the speed of operation.

Referring to both FIGS. 1*a* and 1*b*, the various transfer circuits T2, T3 and T4 shown are all similar to transfer circuit T1. Therefore, the foregoing description for transfer circuit T1 applies equally well to the other transfer circuits shown in block form.

FIGS. 1*a* and 1*b* also show portions of two single-core per stage magnetic core shift registers indicated as register 1 and register 2. Only two stages of each of the registers 1 and 2 are shown; however, it will be appreciated that the number of cores in a register and the number of registers used is essentially unlimited. The primary storage elements in register 1 are in the form of cores 31 and 41, each having two stable states; the primary storage elements in register 2 are in the form of cores 51 and 61, each also having two stable states. Cores 31, 41, 51 and 61 are made of material having substantial magnetic retentivity and all require similar driving currents to shift from one to the other stable state. For purposes of this discussion, the two magnetic states will be referred to as the set and reset states.

The set state is arbitrarily taken as the condition in which the core is left after a pulse of one polarity is applied to a winding of a core and reset state is taken as the condition in which the core is left after a pulse of the opposite polarity is applied to the same winding.

As is known, it can be considered that a bit of data or information is stored in a core when the core is in one stable magnetic state and the core is considered to have no data or information stored therein when the core is in its other stable state.

Assume that all of the cores are in a reset condition. Data is fed to register 1 by applying a positive pulse to input line 42 which pulse is coupled through diode 29 to point A and causes circuit T1 to change to a conducting condition. The operation of transfer circuit T1 is described above and will also be discussed in detail hereinbelow. Next, a negative potential is applied to line 44 which is connected to gate 40. Gate 40 comprises an NPN type transistor which is controlled from external sources to be either conducting or nonconducting; when conducting, it connects a minus 12 volt potential to line 44. The negative potential is impressed on point A through line 44, winding 36, diode 38 and lead 39. A current path is thus established through winding 36 which causes core 31 to switch from its reset state to its set state and circuit T1 to become nonconductive. With core 31 set in the above manner, the core may be said to be storing a "bit" of information.

For purposes to be explained hereinbelow, external switching controls of any suitable known type, not shown, normally bias serial read out control (ROC) line 46, parallel (ROC) line 47, and regenerate (ROC) line 48 to each be at a relatively high negative potential, in the present embodiment, approximately minus or negative 20 volts. When the external sources are switched, the negative potential normally applied to lines 46, 47 and 48 is raised to a less negative or more positive potential; specifically, in this case, the minus 20 volts is raised to approximately minus 12 volts. For example, referring to line 46, the relatively high negative potential is coupled through winding 33 to reverse bias diode 50 so that even if the core 31 switches, the voltage induced in winding 33 is not sufficient to cause diode 50 to conduct. Parallel (ROC) line 47 and regenerate (ROC) line 48 function similarly to line 46 to reverse bias associated diodes 55 and 30 respectively.

The bit of information stored in core 31 may be transferred or shifted to the other transfer circuits and/or to the other cores in the circuit as follows: First, the bit of information may be shifted into transfer circuit or latch T1; second, the bit of information in transfer circuit T1 is transferred back to core 31; third, the bit of information may be shifted from core 31 to transfer circuit T2 and thence to core 41; fourth, the bit of information may be shifted out of core 31 to parallel transfer circuit P1; fifth, the bit of information stored in the parallel transfer circuit P1 may be transferred to core 31 or to core 51; sixth, if desired, when a bit of information is transferred out of core 31, the bit may be regenerated in core 31.

It will be appreciated that transfer circuits T1, T2, T3 and T4 all operate in the same manner in conjunction with registers 1 and 2 so that a description of the operation of transfer circuit 1 and core 31 is deemed sufficient to the understanding of the invention. Likewise, parallel transfer circuits P1 and P2 operate in the same manner in conjunction with registers 1 and 2 so that a brief explanation of the operation of circuit P1 is deemed sufficient to an understanding of the invention.

Consider first the shifting of a bit of information from core 31 back to transfer circuit T1. A shift pulse is applied to line 43 to shift core 31 to its reset state; concurrently, gate 40 is opened, that is, a negative potential (—12 volts) is applied to line 44, and a less negative or a more positive potential is applied to line 48. As indicated hereinabove, since line 48 couples a less negative potential to diode 30, a positive pulse developed as core 31 is switched by current flowing through winding 36, will forward bias diode 30 and point A will become positive. With point A at a positive potential, the transistors 11 and 15 in transfer circuit T1 are caused to conduct and remain conducting or "latch," as discussed above.

Second, as discussed above, to transfer the information out of transfer circuit T1 to core 31, gate 40 is opened to apply a negative potential through line 44, winding 36, diode 38 and lead 39 to point A.

When point A becomes negative, the 40 milliamperes of current that had been flowing through the diode 27 are directed or shunted through lead 39, diode 38, winding 36 and gate 40 to the minus 12 volts potential. This causes core 31 to shift to its set state.

A principal feature of transfer circuit T1 is that it will remain on or conducting unit core 31 is fully switched from one to the other of its stable states. This assures that each core does become fully switched during the switching operation. Until core 31 fully switches, winding 36 presents a significant impedance; when the core switches, the impedance of winding 36 drops to zero and point A is now essentially at a negative (—12 volts)

potential. The feedback circuit from collector 14 of transistor 11 to base 16 of transistor 15 is now disabled causing the transfer circuit to become nonconductive or turn off. The gate 40 essentially completes a short circuit across resistor 19 to temporarily disable the feedback from transistor 11 to transistor 15 thus causing the transfer circuit to turn off.

Third, to shift the bit of information from core 31 to core 41, a shift pulse is applied to shift line 43 concurrently as a less negative potential is applied through serial (ROC) line 46 and winding 33 to diode 50. The current thus caused to flow through winding 35 shifts the core 31 from its set to its reset state. Because winding 33 and diode 50 are now less negative or more positive, the voltage developed across winding 33 as the core 31 is shifted to its reset state is of sufficient magnitude to cause diode 50 to become forward biased and conduct. Point A'' in transfer circuit T2 corresponding to point A in transfer circuit T1 becomes positive and T2 will become conductive or latch and store a bit of data or information. Next, serial gate 40 is opened and a negative potential is applied through line 44 winding 54 and diode 52 to point A''. As described above in connection with circuit T1, a current will flow through diode 52, winding 54, line 44 and gate 40 to the negative potential. Current flow through winding 54 shifts core 41 to its set state.

Fourth, to shift information from core 31 to parallel transfer circuit 51, a shift pulse is applied to line 43 concurrently as a less negative potential is applied through parallel (ROC) line 47 to winding 32 and diode 55. As above, since diode 55 will become forward biased and conducts, the current developed by the voltage induced in winding 32 when the core 31 shifts its magnetic state flows in common line 57; point A' on line 57 thus becomes relatively more positive. Point A' on line 57 corresponds to point A adjacent transfer circuit T1. Parallel transfer circuit P1 is similar to transfer circuit T1 and operates in a similar manner. Thus, when point A' becomes more positive, transfer circuit P1 is caused to conduct to store a bit of information.

Fifth, information may be transferred from parallel circuit P1 to either core 31 in register 1 or to core 51 in register 2. If it is desired to transfer a bit of information from transfer circuit P1 to core 31, parallel gate 49, which is similar to gate 40, is turned on, that is, transistor 49 is caused to conduct to couple a negative potential (−12 volts) to line 45. The negative potential applied to line 45 will forward bias diode 56 and will cause current to flow from transfer circuit P1 through common line 57, diode 56, and winding 34 to the negative potential. Thus, the feedback path in transfer circuit P1 is interrupted causing transfer circuit P1 to turn off. Current flow through winding 34 causes core 31 to shift to its set state.

If it is desired to transfer the information out of transfer circuit P1 to core 51 in register 2, parallel gate 49' is turned on, that is, a negative potential is applied through line 45' and winding 34' of core 51 to diode 56'. Current from transfer circuit P1 will now be directed to flow from transfer circuit P1 through common line 57, diode 56', winding 34', line 45' and gate 49' to the negative potential. Current flowing through winding 34' will shift core 51 to its set state. Note that the lines and gates in register 2 corresponding to the lines and gates in register 1 are similarly numbered and distinguished by primes.

Sixth, when it is desired to regenerate a bit of data in a core, that is, shift the information in a first core to another core or to another transfer circuit and still maintain the same bit of data stored in the first core, regenerate (ROC) line 48 is energized concurrently with a reset line 43 and any of the other lines required to be energized to shift data to the other core or latch, as discussed above. Assume, for example, that a bit of data is to be shifted from core 31 to transfer circuit T2 and thence to core 41 and it is desired to regenerate the bit of data in core 31. A shift pulse is applied through line 43 to winding 35 for resetting core 31; concurrently, a less negative potential is applied through serial (ROC) line 46 and winding 33 to diode 50, and a less negative potential is applied to regenerate (ROC) line 48. The bit of data is shifted to transfer circuit T2, as discussed above.

The less negative potential applied to line 48 forward biases diode 30 when core 31 shifts from its first to its second stable state. The current developed by the voltage induced in winding 37 when core 31 shifts its magnetic state is directed to flow from winding 37 through diode 30, lead 39, and resistor 19 to the negative potential. As discussed above, point A will become positive and transistors 11 and 15 in transfer circuit T1 will become conductive and latch.

Next, serial gate 40 is opened and a negative potential is applied through line 44, winding 36, diode 38 and line 39 to point A which, as noted above, causes the current from transistor 11 to flow through winding 36 to again shift the core 31 to its set condition or regenerate. The negative potential on line 44 is also coupled in parallel through winding 54 and diode 52 to point A''. As described above, transfer circuit T2 will cause current to flow through diode 52 and winding 54 to also shift core 41 to its set state.

Serial-parallel shift registers may be constructed either by utilizing electronic triggers and gates, or by utilizing two storage mediums, one of which is permanent and one of which may be temporary. It has been found that other than in relatively small shift registers, the electronic triggers and gates become extremely unwieldy and the number and cost of components becomes excessive. Because of the facility of utilizing cores as "OR" circuits, cores are preferable as a component of a shift register. When utilizing cores as one of the storage mediums and the transfer circuit as a second storage, the registers are unlimited in size and require no additional components as the number of registers increase. The transfer circuits described above function as a secondary storage element having static or permanent rather than dynamic characteristics. A static or permanent storage is desirable since it provides a stable voltage output corresponding to a logical condition. Any stable voltage corresponding to a logical condition may be obtained from the proper point in the transfer circuit, for example, from transistors 11 and 15 of circuit T1. Resistors may, of course, be added to decrease power dissipation, as necessary. Thus, the shift register, according to the invention, utilizes the advantages of both the cores and of the transfer circuits to provide an improved shift register which operates at a relatively high speed, can provide a stable voltage output corresponding to a logical condition and is relatively low in cost. Increased speed of operation is obtainable over circuits utilizing capacitors since the transfer circuit does not obtain its operating power from the adjacent core as does the capacitor and, therefore, relatively smaller diameter cores may be used in the matrix. As is known, smaller cores have higher speeds of operation. Comparatively, an increase in speed of operation of about 4 to 1 relatively to registers utilizing capacitors is obtainable.

In addition to its use in shift registers, the transfer circuits may be used as a multivibrator, as a binary latch, and in timing rings.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Data transfer apparatus comprising, in combination, a plurality of primary storage elements each having two stable states, a secondary storage element having primary and second operating conditions and capable of permanently storing binary data therein, means for providing a common input and output connection to said secondary storage element, means for selectively energizing said primary storage elements to shift from one to the other of the stable states to read in and read out binary data, switching means for connecting the primary storage elements selectively energized to read out data to energize secondary storage element, and means for selectively connecting said secondary storage element to selectively read into one of the associated primary storage elements.

2. Apparatus according to claim 1 wherein said primary storage elements each comprise a magnetic core having winding means disposed thereon.

3. Apparatus according to claim 1 wherein said secondary storage elements comprise a transistor latch circuit having a stable conducting condition and a stable nonconducting condition.

4. Data transfer apparatus comprising, in combination, a plurality of primary storage elements each having two stable states, means for selectably energizing each of said storage elements to shift from one to the other of its stable states to read in and read out binary information, a secondary storage element having first and second conditions of energization and capable of permanently storing binary data therein, said secondary storage element being connected in common to a group of said primary storage elements, first switching means for connecting a primary element selectively energized to read out to said secondary storage element to transfer data thereto, means for changing the condition of energization of said secondary storage element, and second switching means for selectively reading from said secondary storage element into one of said primary storage elements.

5. Apparatus according to claim 4 wherein said switching means comprise unilateral conducting devices biasable to a low forward impedance condition or to a high forward impedance condition.

6. Apparatus in accordance with claim 1 wherein said primary storage elements comprise bistable magnetic cores having windings thereon and said secondary storage element comprises a transfer circuit including, first and second interconnected transistors, means for providing operating potentials to said transistors, a feedback path from said second to said first transistor, means for coupling signals to and from said feedback path, a signal of a first polarity rendering said first transistor conductive, an impedance element connected in said feedback path to have current from said second transistor flowing therethrough for developing a voltage to maintain said first transistor in conduction and thereby also maintain said second transistor in conduction, a diode connected to said feedback path for converting said path from a constant current to a constant voltage point as long as said diode is conducting, and a winding of a core having one terminal connected to said feedback path, means for applying a signal of a second polarity to said feedback path when said core is shifted from one to the other of its stable states, said winding providing a relatively high impedance during the period said core shifts from one to the other of its states and then providing a lower impedance to current flow to shunt said impedance element whereby said feedback path is interrupted and said transistors will change their conducting conditions after said core is fully switched.

7. For use in data handling apparatus, a transfer circuit comprising, in combination, first and second transistors, means for providing operating potentials to said transistors, means for providing a feedback path from said second to said first transistor, means for coupling input and output signals to said feedback path, an impedance element connected in said feedback path to have current from said second transistor flowing therethrough toward a first potential level for developing a voltage to maintain said first transistor conductive and thereby also maintain said second transistor in conduction once conduction is initiated, a diode connected to said feedback path for converting said feedback path from a constant current to a constant voltage point as long as current flows through said diode, a winding of a bistable magnetic core having one terminal connected to said common means, and means for coupling said signal of said first potential through said winding to said feedback path as said core is shifted from one to the other of its stable states, said winding providing a relatively high impedance until said core completely shifts from one to the other of its states, said winding then short circuiting said impedance and disabling said feedback path to cause said transistors to become nonconductive.

8. Data transfer apparatus comprising, in combination, a plurality of primary storage binary elements connected in serial groups, a plurality of groups of said primary elements, a plurality of secondary storage elements each having first and second conditions of energization and capable of permanently storing binary data therein, one of said secondary elements being associated with each primary element in a group, a plurality of common conductors, one of said conductors connecting in parallel to one of the primary storage elements in each group, a secondary storage element connected to each of said common conductors, means for selectively energizing said primary elements to shift from one to the other of their stable states to read in and read out binary data, switching means in a first condition connecting the primary elements to selectively read out to the succeeding primary elements in a group, said switching means in a second condition connecting the primary elements to energize the associated secondary element to its first condition for storing binary data therein, said switching means in a third condition connecting each secondary element to change to its second condition to read out to the associated primary element, and said switching means in a fourth condition connecting said primary elements to energize the secondary element connected to the associated common conductor to a first condition for storing binary data therein, said switch means in a fifth condition energizing the secondary element connected to said common conductor to selectively read into any one of said primary elements connected to said associated common conductor.

9. For use in data handling apparatus, a transfer circuit comprising, in combination, first and second transistors of opposite conductivity types each having a base, an emitter and a collector, the collector of each transistor being connected to the base of the other transistor for providing feedback paths, means connecting said transistors to sources of operating potentials, an impedance element connected in the collector circuit of the first transistor and to a first negative potential, a diode having its anode connected in the collector circuit of said first transistor and its cathode connected to a second negative potential of lesser magnitude than said first negative potential, means for coupling positive and negative input signals to junction of the base of said second transistor and the collector of said first transistor, a positive signal rendering said transistors conductive and said transistors remaining conductive due to said feedback paths current flowing through said first transistor and said impedance element causing said diode to be forward biased and the larger portion of the current flowing through said first transistor to flow through said diode, a negative signal causing the current flowing through said first transistor to be shunted away from said impedance element whereby no voltage is developed across said impedance element and the feedback path from said first transistor to said second transistor is interrupted causing said transistors to become nonconductive.

10. A data transfer circuit comprising, in combination, first and second interconnected electron controlling devices, means for providing operating potentials to said devices, a feedback path from said second to said first device, means for coupling signals to and from said feedback path, a signal of a first polarity rendering said first device conductive, an impedance element connected in said feedback path to have current from said second device flowing therethrough for developing a voltage to maintain said first device in conduction and thereby also maintain said second device in conduction, a unilateral conducting element connected to said feedback path for converting said path from a constant current to a constant voltage point as long as said element is conducting, gating means for selectively applying a signal of a second polarity to said feedback path to shunt said impedance whereby said feedback path is interrupted and said devices will change their conducting conditions.

References Cited by the Examiner

UNITED STATES PATENTS

| | | | |
|---|---|---|---|
| 2,622,213 | 12/1952 | Harris | 340—174 X |
| 2,958,075 | 10/1960 | Torrey | 340—174 |
| 2,966,979 | 1/1961 | Zarling. | |
| 2,976,428 | 3/1961 | Parkhill et al. | |

OTHER REFERENCES

August 1959—publication: IBM Technical Disclosure Bulletin, Adams et al., "Core Shift Register," vol. 2, No. 2.

ROBERT C. BAILEY, *Primary Examiner.*

IRVING L. SRAGOW MALCOLM A. MORRISON, *Examiners.*